July 2, 1940.  W. RICHLI  2,206,204

JUICE SEPARATOR AND PULP EJECTOR

Filed Dec. 5, 1938  2 Sheets-Sheet 1

INVENTOR
Wm. Richli
BY
ATTORNEY

July 2, 1940.  W. RICHLI  2,206,204
JUICE SEPARATOR AND PULP EJECTOR
Filed Dec. 5, 1938  2 Sheets-Sheet 2

INVENTOR
Wm. Richli
BY
ATTORNEY

Patented July 2, 1940

2,206,204

UNITED STATES PATENT OFFICE 2,206,204

JUICE SEPARATOR AND PULP EJECTOR

William Richli, Stockton, Calif.

Application December 5, 1938, Serial No. 243,995

5 Claims. (Cl. 210—70)

This invention relates to machines for extracting the juices from raw carrots, celery and other legumes whose juices have been determined as having various health promoting qualities, and which are now consumed in the form of drinks.

The main object of this invention is to improve the construction and operation of machines of this character so that the pulp from the legume being acted upon will be ejected from the machine at the same time the juices are being extracted and drained off, so that juice extracting operations may be carried on indefinitely without any possibility of the machine becoming clogged and without the necessity of having to stop operations every so often to clean out the pulp.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
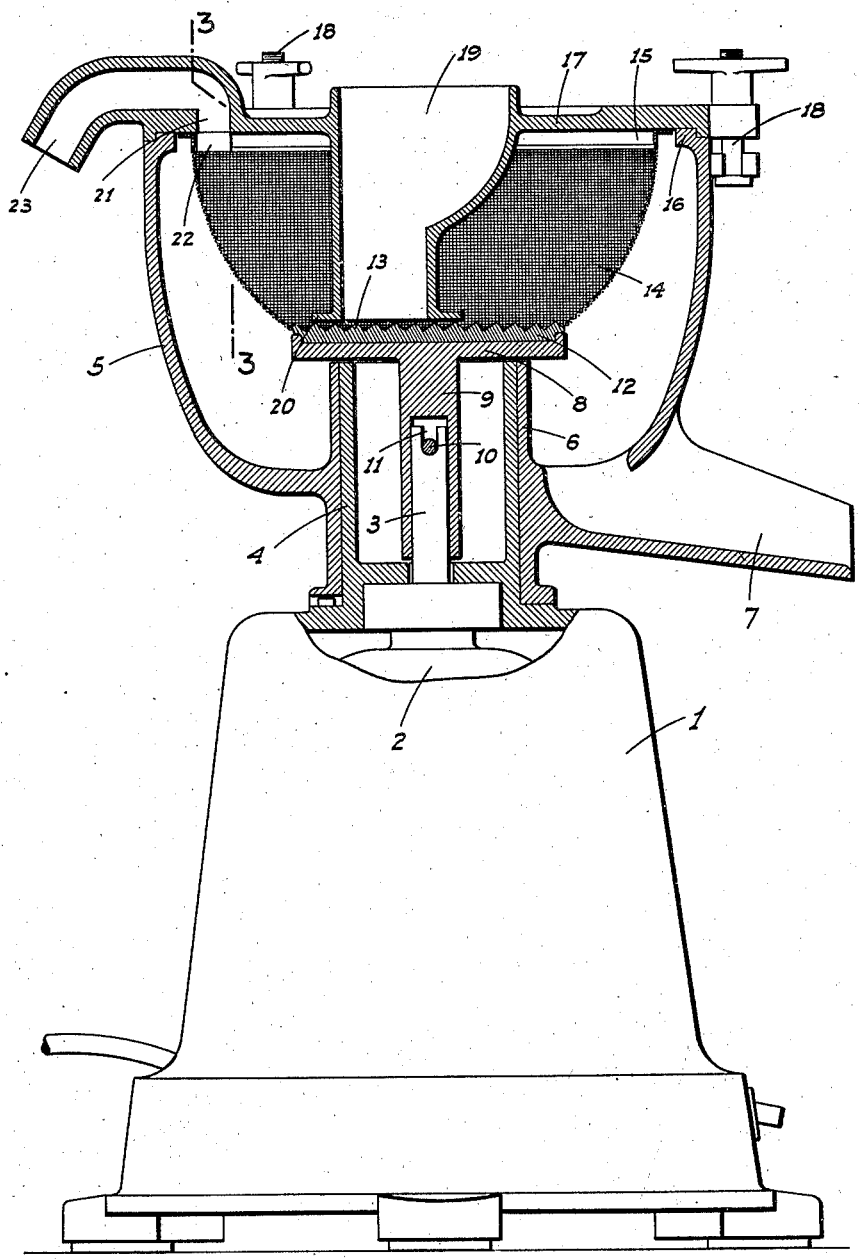
Figure 1 is a side elevation of my improved extractor, mainly in section.

Referring now more particularly to the characters of reference on the drawings, the machine comprises a hollow upstanding base 1 in which a drive motor 2 is mounted in any suitable manner. The motor is set with its axis vertical and the motor shaft 3 projects upwardly and into an open cylindrical boss 4 upstanding from and rigid with the base, the shaft being concentric with the boss.

The boss forms the mounting means for the juice retaining bowl 5 which has a central sleeve 6 removably engaging the boss; said bowl being formed with a radially and downwardly projecting spout 7 at the bottom. Disposed in the bowl just above the top of the sleeve and boss (which terminate well below the top of the bowl) is a disc 8, considerably smaller in diameter than the bowl. A central depending socket member 9 is formed on the disc, which slidably engages over the shaft 3 and is provided with a cross pin 10 riding in a slot 11 cut crosswise in the top of the shaft. The disc therefore rotates with the shaft.

Secured on the disc is a plate 12 formed with abrading or grinding elements 13 of suitable form on its upper face.

A fine mesh screen basket 14 extends upwardly from and about the grinding plate, being suitably mounted in rigid connection therewith. This basket flares upwardly and outwardly from the plate with an interior convex curvature, and terminates in a rim band 15 disposed immediately adjacent but clear of and substantially on a level with the overhanging top rim flange 16 of the bowl.

Centered on the bowl is a cover plate 17, removably held in place by suitable means such as a plurality of manually operable clamping screws 18 disposed about the edge of the plate outwardly of the bowl.

Figure 2:
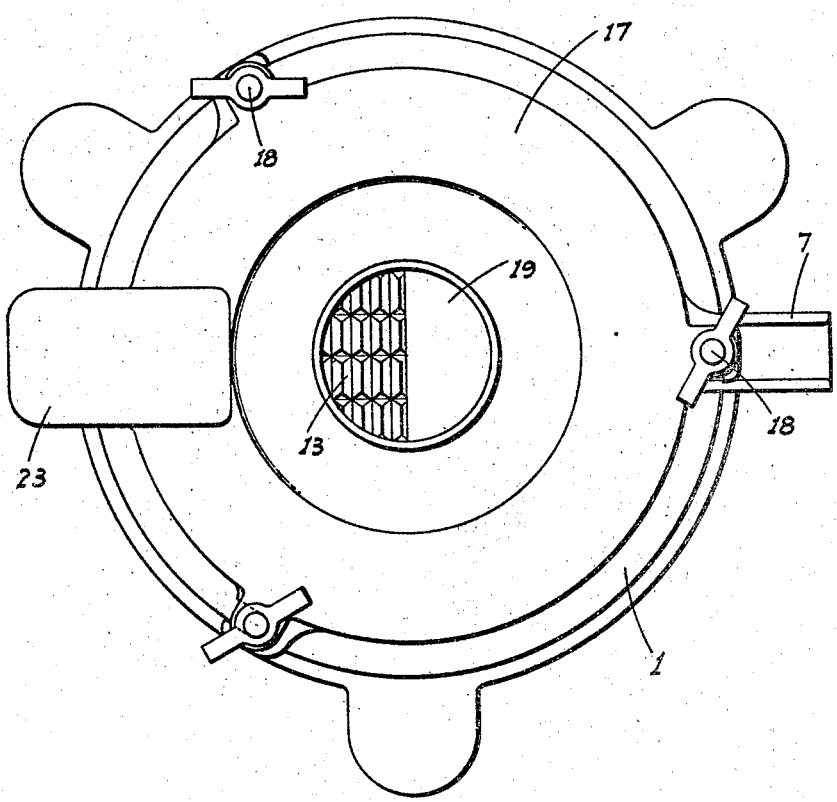
Figure 2 is a top plan view of the same.
Figure 3:
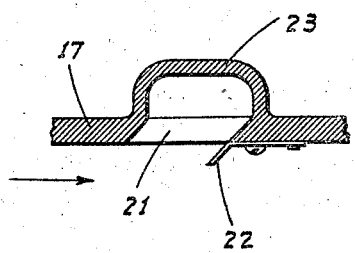
Figure 3 is a fragmentary vertical section on line 3—3 of Fig. 1.

The cover plate is provided with a depending feed passage member 19 which terminates at its lower end in an outwardly projecting base flange 20 which just clears the grinding plate. The bore of the member is preferably circular at the top and is centered in the plate 17, but at the bottom it is restricted on one side so that the passage is there of substantially semicircular form, as plainly shown in Fig. 2, and is entirely offset from the center of the grinding plate.

With the above described structure, it will be seen that if a legume is inserted in the feed passage and pressed against the grinding plate (which is rotated at a reasonably high speed by the motor) such legume will be rapidly disintegrated into small fragments. These, together with the juice exuded as the grinding proceeds, are thrown centrifugally against the basket, the juice passing through the basket and being caught by the bowl, from which it drains from the spout into any suitable receptacle positioned thereunder.

Due to the shape of the basket the pulp fragments, as they are thrown centrifugally, will also rise until they reach the rim band of the basket. Here the pulp is scraped off and discharged from the machine with its operation by the following means:

Formed in the cover plate adjacent but radially inward from the rim band of the basket is an arcuately extending slot 21. Depending at a forward slope from the far end of the slot (relative to the direction of rotation of the basket) is a radially disposed scraping and elevating blade 22. This projects into the basket as close as practicable to the rim band 15, so as to scrape pulp from said band as it accumulates thereon, and cause the scraped pulp to be deflected upwardly and through the slot 21. A discharge spout 23 on the cover plate extends from over the slot to a depending termination clear of the bowl 5, as shown in Fig. 1, so that the pulp discharging from the spout after being forced therethrough by the action of the blade may be caught in a receptacle positioned beneath said spout.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A juice extractor comprising a screen basket in which ground-up juice-containing pulp is deposited and disposed with its axis vertical, means to rotate the basket whereby the pulp will be thrown centrifugally against the basket and the juice will pass therethrough, the basket being shaped so that with its rotation the pulp will rise to adjacent the top of the basket, an upwardly sloping fixed blade depending into the basket adjacent its periphery, and a discharge spout above and into which the blade delivers.

2. A juice extractor comprising a screen basket in which ground-up juice-containing pulp is deposited and disposed with its axis vertical, means to rotate the basket whereby the pulp will be thrown centrifugally against the basket and the juice will pass therethrough, the basket being shaped so that with its rotation the pulp will rise to adjacent the top of the basket, a fixed juice collecting bowl about the basket, a cover plate mounted on the bowl over the basket, the latter terminating close to the plate and the latter having an arcuately extending opening radially inward of but adjacent the top of the bowl, and a blade fixed on the plate and depending into the bowl from the far end of the slot relative to the direction of rotation of the basket, the radially outer edge of the blade lying close to the inner surface of the basket at the top.

3. A device as in claim 2, with a discharge spout on the plate extending radially out from about the opening to a termination on one side of and clear of the bowl.

4. A device as in claim 1, in which the spout extends laterally of the extractor to a downwardly facing termination at one side of the extractor.

5. A juice extractor comprising a vertical-axis screen basket in which ground-up juice containing pulp is deposited, means to rotate the basket whereby the pulp will be thrown against the basket and the juice will pass therethrough, the basket being shaped so that with its rotation the pulp will travel toward the rim of the basket, a sloping blade projecting into the basket adjacent its rim to scrape off pulp adhering thereto and a discharge spout for pulp into which the blade delivers.

WILLIAM RICHLI.